United States Patent
Schmid et al.

(10) Patent No.: US 7,254,883 B2
(45) Date of Patent: Aug. 14, 2007

(54) METHOD FOR MANUFACTURING A PACKAGING MATERIAL IN THE FORM OF A LAMINATE WITH AN ELECTRICALLY CONDUCTIVE LAYER FORMED AS AN ANTENNA STRUCTURE

(75) Inventors: Günter Schmid, Hemhofen (DE); Hagen Klauk, Erlangen (DE); Marcus Halik, Erlangen (DE)

(73) Assignee: Infineon Technologies AG, Munich (DE)

(*) Notice: Subject to any disclaimer, the term of this patent is extended or adjusted under 35 U.S.C. 154(b) by 90 days.

(21) Appl. No.: 11/124,593

(22) Filed: May 6, 2005

(65) Prior Publication Data

US 2005/0210658 A1  Sep. 29, 2005

Related U.S. Application Data

(62) Division of application No. 10/609,872, filed on Jun. 30, 2003, now abandoned.

(30) Foreign Application Priority Data

Jun. 28, 2002  (DE) .............................. 102 29 168

(51) Int. Cl.
*H02P 11/00* (2006.01)

(52) U.S. Cl. ............................ 29/600; 29/601; 29/832; 156/256; 438/108; 438/125

(58) Field of Classification Search ................. 29/825, 29/832–846, 600, 25.03, 25.42; 340/572.8; 343/806, 895, 700 MS; 228/180.21, 180.22; 156/256, 277
See application file for complete search history.

(56) References Cited

U.S. PATENT DOCUMENTS

| 5,528,222 | A |   | 6/1996 | Moskowitz et al. |
| 5,566,441 | A | * | 10/1996 | Marsh et al. ................. 29/600 |
| 6,147,662 | A |   | 11/2000 | Grabau et al. |
| 6,358,437 | B1 |   | 3/2002 | Jonas et al. |
| 6,437,985 | B1 | * | 8/2002 | Blanc et al. ................. 361/749 |
| 6,957,481 | B1 | * | 10/2005 | Patrice ........................ 29/600 |

FOREIGN PATENT DOCUMENTS

| DE | 197 31 969 A1 | 8/1998 |
| DE | 197 57 542 A1 | 6/1999 |
| DE | 298 24 033 U1 | 5/2000 |
| DE | 199 55 120 A1 | 5/2001 |
| EP | 0 083 046 A2 | 7/1983 |
| EP | 1 162 480 A2 | 12/2001 |

* cited by examiner

*Primary Examiner*—Minh Trinh
(74) *Attorney, Agent, or Firm*—Laurence A. Greenberg; Werner H. Stemer; Ralph E. Locher

(57) ABSTRACT

A laminate is formed from a carrier layer and an electrically conductive layer. In one section, the conductive layer is formed into an antenna structure. The laminate is formed by placing a mask onto a packaging film and vapor-depositing aluminum onto the packaging film and the mask. After removal of the mask, only a desired antenna structure remains on a section of the packaging film. Then a microchip, is adhesively bonded to the packaging film and conductively connected to an end of the antenna structure, so that data can be written in or read out without contact in a wireless transponder system.

10 Claims, 2 Drawing Sheets

METHOD FOR MANUFACTURING A PACKAGING MATERIAL IN THE FORM OF A LAMINATE WITH AN ELECTRICALLY CONDUCTIVE LAYER FORMED AS AN ANTENNA STRUCTURE

CROSS-REFERENCE TO RELATED APPLICATIONS

This is a divisional application of application Ser. No. 10/609,872, filed Jun. 30, 2003 now abandoned; the application also claims the priority, under 35 U.S.C. §119, of German patent application No. 102 29 168.3, filed Jun. 28, 2002; the prior applications are herewith incorporated by reference in their entirety.

BACKGROUND OF THE INVENTION

Field of the Invention

The invention relates to a method for manufacturing a packaging material in the form of a laminate with an electrically conductive layer formed as an antenna structure.

Transponder technology permits data to be read from and stored in a microchip without contact. For this purpose, the microchip is connected to an antenna, with which electromagnetic radiation required to write to or read from the microchip can be received and transmitted. Using an external transmitting and receiving unit, it is possible to communicate with the microchip via electromagnetic radiation. In this case, the microchip generally does not have its own power supply. Instead, the radiation used to write to or read from the microchip is also used to supply power to the microchip.

The technology needed for this purpose could hitherto not be produced below a certain cost frame. For this reason, the corresponding apparatus is at present profitable only for relatively expensive articles. For example, the transponder technology is used to find buried pipelines or it is employed for rapid detection of animals in a herd. For example, in large herds of cattle, the animals are given a transponder implanted under the skin. The animals can then be driven very simply past a transmitting and receiving station, in which the data stored on the microchip can be read out without contact, in order for example to identify the animal. A further field of application is the electronic anti-theft protection of expensive luxury goods, such as fur coats, perfumes, CD-ROMs etc. For this purpose, however, the retail trade has to be equipped with appropriate devices for reading from the microchips.

Further applications are, for example, monitoring important documents and files in government or administrative buildings, the files being registered electronically at the individual processing stations in order to follow their path more easily or in order to find the files easily again. For this purpose, a transmitting and receiving station can be fitted, for example, in a door frame, so that the files are registered electronically when they are moved into a given room and out of the room. Another exemplary application is the administration of unloading of pieces of luggage in railroad stations, harbors or airports. It is thereby necessary for the piece of luggage to be led to a specific location aimed at a specific destination. For these applications, an individual per piece price of approximately 0.50¢ for a label which comprises a memory chip and a transmitting and receiving unit represents the cutoff price for profitability.

Hitherto, transponder technology has primarily been used for goods which have a very long life or a very high value. The comparatively high costs have hitherto prevented the introduction of transponder technology on a broader basis.

However, there is interest in technology in many sectors in which a large amount of data has to be registered in short time periods. Examples are electronic stamps, or the use of electronic labels in the retail trade, for example in supermarkets. Here, the goods, for example located in a shopping cart, can be registered without contact at an electronic cash register and an invoice can be drawn up. The data about the goods thus registered can then be used, for example, for inventory maintenance.

Since these consumer and consumable articles have a value of only a few dollars, the costs for the electronic labels must be reduced considerably. In this connection, there is discussion about a minimum cost limit of about 5 cents per label, which is to be aimed at for an introduction suitable for the market.

In order to be able to produce an electronic label inexpensively, firstly the costs for the microchip have to be reduced, and secondly the costs for the transmitting and receiving unit, such as the antenna. At the present time, coils are mostly used as the antenna. However, these antennas are far too costly for the applications described above. Also known are antennas made of metal foil, the antenna structure being produced first and then being applied to a carrier. In this case, the antenna structure can be produced in various ways, such as:

a) a metal film is laminated to the carrier over its entire surface and then structured subtractively by selective etching;

b) the antenna structure is punched out of a metal foil and then laminated onto the carrier;

c) the antenna structure is printed or sprayed onto the carrier by using electrically conductive pastes;

d) a mask is defined photolithographically on the carrier (for example by using a photoresist); the interspaces not covered by the mask on the carrier are then metalized without using power.

In the above-mentioned examples, it is important that an antenna structure is produced separately from a second laminate and that the metal foil is not necessarily a constituent part of a package.

These methods, however, are all too costly for the production of antennas which are suitable for the above-described applications.

SUMMARY OF THE INVENTION

It is accordingly an object of the invention to provide a method for manufacturing a packaging material in the form of a laminate with an electrically conductive layer formed as an antenna structure, which overcomes the above-mentioned disadvantages of the heretofore-known devices and methods of this general type and which provides for a cost-effective antenna structure that permits the use of transponder technology even for goods which are under high cost pressure.

With the foregoing and other objects in view there is provided, in accordance with the invention, a packaging material, comprising:

a laminate formed with at least one carrier layer and a conductive layer on said carrier layer;

an antenna structure forming a constituent part of said conductive layer; and a microchip conductively connected to said antenna structure, for enabling contact-free data interchange between said microchip and a transmitting and receiving station via said antenna structure.

In other words, the objects of the invention are achieved by a laminate that is formed of at least one carrier layer, or substrate layer, and an electrically conductive layer applied to the carrier layer. The antenna structure is formed from the electrically conductive layer in at least in one segment of the conductive layer.

The laminates according to the invention make use of structures such as are already used for the packaging of foodstuffs to provide an antenna structure. In many foodstuff packages, for the purpose of conservation, laminates are used which comprise metal-containing films or metal layers. The metal layer in this case acts as an oxygen barrier and prevents the rapid spoiling of the foodstuffs, whose contents would otherwise oxidize as a result of atmospheric oxygen penetrating in.

In order to impart the necessary stability to the packaging material, the metal layer is applied to a carrier which has the required robustness. For example, packaging boards for the production of beverage packages or plastic films for the production of chip bags are suitable.

The metal layer contained in such a laminate has a sufficient electrical conductivity to be able to produce an antenna structure from this layer. An important constituent part of the laminate according to the invention is, therefore, the presence of an antenna as a constituent part of the electrically conductive layer, which permits data and information to be written into a memory, which is connected to the antenna structure, or read from said chip by a transmitter or receiver located outside.

The laminate according to the invention therefore comprises a carrier layer, which is used for mechanical stabilization, and an electrically conductive layer applied to the carrier layer. The antenna structure is formed as part of this electrically conductive layer. In this case, the arrangement of the antenna structure in the electrically conductive layer is not subject to any restrictions. For this purpose, any desired, sufficiently large, free area on the electrically conductive layer is considered. Should it be required, and if the space available permits, a plurality of antenna structures can also be formed on the electrically conductive layer. In this case, it is necessary for the antenna density to be matched to the size of the package. In order to ensure the functionality of the transponder structure produced, it is sufficient for only one antenna structure to be connected to a microchip.

In addition to the number of antenna structures, the size of the antenna within the scope of the space required is also arbitrary, since in principle the entire surface of the laminate or of the electrically conductive layer contained in the latter is available.

For the production of packages, the laminates according to the invention can be provided in relatively large containers, for example in rolled-up form, or as relatively large sheets of a laminated board. For the production of packages, appropriate pieces, which in each case comprise one or more antenna structures, are then separated from the roll or punched out of a larger board and processed further to form a package. For the production and filling of packages, the known apparatus can be used.

In order to protect the electrically conductive layer against damaging environmental influences (scratches, contaminants), it is advantageous if a covering layer is applied to the electrically conductive layer. This covering layer can be, for example, a varnish layer or a further layer of a board. A layer of a plastic is likewise possible. By means of the additional layer, in addition to the protection against external influences, a higher mechanical stability of the laminate is also achieved.

It is particularly advantageous if the covering layer consists of a water-repellent material since, as a result, firstly possible corrosion of the electrically conductive layer is prevented and secondly the penetration of water-soluble contaminants into the laminate and the interior of the package is ruled out. Particularly preferably, the covering layer used is a layer of a plastic, such as is usual, for example, in beverage packages, such as milk cartons. In this preferred embodiment, the laminate therefore comprises a carrier layer, for example of board, an electrically conductive layer, for example an aluminum layer, and a plastic layer, these being arranged on one another in this order. According to the invention, in this case the electrically conductive layer contains the antenna structure.

In order to widen the range of application of the invention, the covering layer can also be formed as an adhesive layer, so that the laminate can be stuck onto an object which is to be provided with corresponding labeling, such as a file or another document. The adhesive layer can also be formed as a separate layer and, for example, applied to the carrier layer or to the covering letter. However, the embodiment as a packaging material is preferred, the layer having an electrically conductive layer that is continuous in the surface, and sections of the electrically conductive latter being formed into an antenna structure.

The electrically conductive layer preferably contains at least one metal. Most metals are relatively good electrical conductors and are therefore very suitable for the construction of the antenna structure. Furthermore, the metals needed are relatively easy to produce and uncomplicated to process. In particular, it is possible to shape most metals into thin layers with a conductivity which is still adequate, by which means the expenditure on material is reduced to a low extent and the material costs can be kept low in a countermove.

It is particularly advantageous if the metal is aluminum, since this metal is easily accessible and has a very good electrical conductivity. In addition, this metal has mechanical properties (extensibility, rolling behavior) which are advantageous for processing to form foil material. The use of aluminum is widespread in the production of packages for foodstuffs. In other applications, in which no statutory foodstuffs regulations have to be met, other metals can also be used, for example copper.

As an alternative to the use of metals as carrier of the electrical conductivity, in another embodiment the electrically conductive layer of the laminate according to the invention can also contain at least one conductive organic compound.

In this connection, electrically conductive polymers are known, such as condensed aromatic materials or semiconductors based on polythiophene or polyaniline which, in order to increase the electrical conductivity, are provided with doping (for example camphor-sulfonic acid-doped polyaniline, polystyrene sulfonic acid-doped poly(ethylenedioxy)thiophene). In order to be able to connect the end of the antenna to the microchip, in the case of the coil used as an antenna, either the end in the center has to be led outward, or the outer end has to be led inward. For this purpose, a bridge structure is needed, with which the end of the coil is led over the turns.

For this purpose, electrically conductive organic materials, such as polyaniline doped with camphor sulfonic acid or poly(ethylenedioxy)thiophene doped with polystyrene sulfonic acid can advantageously be used, since the bridge structure in this case can be produced very simply by means of printing techniques.

Conductive organic compounds can generally easily be processed by means of printing techniques. Since work is being carried out intensively on the development microchips based on organic semiconductors, the transmitter unit and memory module can be produced simultaneously with such chips. As compared with some metals, in particular noble metals, the production costs of organic semiconductors are also lower. Furthermore, organic materials often have more beneficial deformability characteristics and therefore make further processing easier.

It is advantageous if the carrier layer is built up from a paper-like material, since paper has a low weight and nevertheless imparts sufficient stability and strength to the laminate.

Paper-like materials are all materials which contain cellulose as a basic constituent part, that is to say, in addition to paper, also paperboard, papier maché, board, wood, etc.

Use of polymers as carrier material is also preferred. In this case, in addition to the plastics which can be produced synthetically with a wide range of material characteristics, polymers is also to be understood to mean naturally occurring polymers such as silk, natural fibers, cotton, etc. In particular, synthetic polymers have a very low specific weight, can be loaded mechanically extremely highly and produced cost-effectively.

Also conceivable is a mixture of paper-like material and a polymer, in order to combine the advantages of the two generic material types.

For use as a carrier material, it is important that the compounds used exhibit good dielectric characteristics, in order to ensure adequate insulation of the conductive structures applied.

It is particularly advantageous if the laminate is shaped into a package which encloses a hollow space. As a result, goods of an extremely wide range of types can be enclosed and transported within the hollow space. In this case, the laminate serves as a package and a storage medium for data about the packaged goods, for example their date of manufacture or their price. On the outside, the package can also bear a decorative imprint, for example the product name. Here, as compared with the known packages, there are no restrictions. The production of the package and its filling are carried out in accordance with known methods and with known apparatuses. Specific rebuilding of these apparatuses is therefore not required.

The laminate configured as a package is suitable in particular for packaging foodstuffs. These have to be protected against external influences or, if required, in the case of liquids, there is in any case the necessity for the appropriate storage possibility. In essence, the already known foodstuffs packages which contain a metal layer, for example as an oxygen barrier, can be developed further to form a package according to the invention, by an appropriate antenna structure being provided in the metal layer.

Most rotting processes need oxygen, since these processes are basically "silent combustion." It is therefore advantages, in particular if the laminate is used as a package for a foodstuff, if the laminate is impermeable to oxygen. This prevents diffusion of the oxygen in the atmosphere into the interior of package, and slows down spoiling.

In a further embodiment, the laminate according to the invention therefore comprises, at least in some sections, a layer of an oxygen-impermeable material. In this way, the passage of oxygen into the interior of package, even into the sections not covered by the electrically conductive layer, can be prevented and, as a result, spoiling and rotting processes which require oxygen, that is to say aerobic processes, can be slowed down and therefore the ability of the relevant foodstuff to be kept can be increased.

The non-metalized area, as a result of the antenna being cut out, is extremely small as compared with the total area of the package, so the quality of the foodstuff is generally not impaired. Oxygen diffusion through the cutouts may be prevented completely by the interspaces being filled with a suitable polymer film. Alternatively, oxygen diffusion can also be prevented by the application of a covering film to the antenna structure. For the case in which organic materials are used as conductive materials, a covering film of this type is also needed for mechanical protection of a microchip produced from polymer materials. In the normal case, however, following the structuring, a packaging board with small cutouts is laminated on. The positioning accuracy of 100-200 μm, normally achievable, of the lamination operation is completely adequate for the contact opening.

In a particularly preferred embodiment of the laminate according to the invention, an information carrier is provided which is conductively connected to the antenna structure. Various items of information about the product contained in the package can be stored on this information carrier, for example type of product, price, date of manufacture, best-before date and the like.

Suitable in particular as an information carrier is a microchip which is capable of storage, since the production technology for this type of component is well-developed and production costs are correspondingly low. Particularly preferably, the microchip is based on organic semiconductor materials, since microchips of this type can be produced cost-effectively. Of course, a microchip produced using conventional silicon technology can also be used.

In order to improve the electronic characteristics, it is advantageous if an electronic capacitor is provided, which is electrically conductively connected to the antenna structure. The capacitor improves the resonant behavior considerably via its capacitive effect. Should an additional electrode be needed, this can be formed by the electrically conductive layer.

In a particularly preferred embodiment, the antenna structure has turns, since in this geometric shape, the resonant behavior is most beneficial. For each frequency, an optimum number of turns exists. In this case, the number of turns that can be produced should lie as close as possible to the optimum value in order to achieve a high efficiency. Here, the efficiency is higher the greater the enclosed area. Furthermore, the efficiency also depends on the size of the read coil. The efficiency should be selected optimally in order to optimize the injection of the energy of the high frequency with regard to its efficiency. The better the injection of energy into the antenna structure, the higher are the reading distance and the reading integrity that can be achieved.

During the maximization of the number of turns, care should be taken that the structure within the antenna does not become too small since otherwise, because of the layer thickness, which is low in any case, of a familiar metal laminate, very high resistances will occur, which lead to a disadvantageous electronic behavior.

On the other hand, the high resistances caused by the low layer thickness of the electrically conductive layer can be balanced out by means of broader structures.

The production of the laminate according to the invention is carried out on normal production lines, which are extended by one stage for structuring the conductive layer, generally an aluminum layer.

The first possible way of producing the substrate according to the invention consists in the use of a shadow mask. This shadow mask has openings which correspond to the antenna structure. The shadow mask is placed on the carrier, for example a plastic film or a board, and fixed. For the purpose of fixing, the shadow mask can be held firmly, for example, by a magnet. For this purpose, the shadow mask should be built up from any magnetizable material. Then, aluminum, for example, can be vapor-deposited directly onto the carrier and the shadow mask arranged thereon. Following the vapor deposition, the shadow mask with the excess aluminum can be removed, so that only the desired antenna structure remains on the section of packaging film. In this case, vapor-deposition with aluminum is carried out using known apparatuses, such as are already known for the production of packaging materials. The deposition of the metal, for example aluminum, is particularly preferably carried out by means of directed deposition. If the shadow mask has an adequate thickness, then only slight coverage occurs at the edges of the cutouts which correspond to the antenna structure. The shadow mask can then be taken off the carrier very easily again, since the aluminum layer can be severed very easily at the edges of the shadow mask, and the aluminum layer is therefore not lifted off the carrier. A microchip can then be adhesively bonded to the packaging film with an electrically conductive adhesive and connected to the end of the antenna structure. Contact with a microchip can also be made with a nonconductive adhesive, if the contact is produced by appropriate bridge structures (bumps).

In a further production method, the negative image of the antenna is printed onto the carrier with a water-soluble varnish. A suitable water-soluble varnish is, for example, a polymeric alcohol, such as polyvinyl alcohol. A suitable printing process is, for example, pad printing. The layer thickness of the varnish film is about 2 µm in this case. If the mask can be separated again in the subsequent method, then in principle other printing techniques, for example offset, flexographic or gravure printing) are also suitable for the application of the mask.

In a manner analogous to the use of a shadow mask, vapor-deposition of the film with aluminum is then carried out up to a sufficient layer thickness of, normally, 400 nm. In this case, too, the incomplete coverage of the edges during directed deposition of the metal layer is advantageous, since the necessary area of attack for the printing medium is provided and the mask can easily be separated again. Since the aluminum does not adhere to the varnish layer, the aluminum which is merely weakly adsorbed thereon can easily be removed with water (what is known as the lift-off process) during a subsequent rinsing step. Following the rinsing step, the antenna structure is then obtained at the desired point. A substantial advantage, as compared with the method described above by using a shadow mask, is a considerable increase in the achievable resolution.

In the case of larger packages, the film can also be structured by known mechanical methods.

The structuring can also be carried out during a gas-phase deposition process. Films are usually produced from a polymer material which is built up from non-polar hydrocarbon monomers. The film material consequently has a considerably hydrophobic character. Many types of particle and, in particular, also metal vapors are adsorbed preferentially on hydrophobic surfaces, since they themselves have hydrophobic properties. By means of applying a thin layer of a hydrophilic material to the film to be printed, for which purpose, in particular polymers provided with polar groups are suitable, such as polyvinyl alcohol, polyacrylates or cellulose, the deposition of aluminum on these regions can be prevented by a chemical gas-phase deposition process (CVD). This effect could be shown by T. Kodas, M. Hampden-Smith, The Chemistry of Metal CVD, Wiley-VCH 1994, ISBN 3-527-29071-0, page 454.

The laminate according to the invention permits a considerable reduction in the production costs and may be produced without difficulty by means of the processes already used in industrial fabrication, these having to be modified only slightly. The advantages of the laminate according to the invention are summarized once again in the following text:

a) the costs of an additional metalization, which arise from the separate construction of the antenna, are avoided;

b) the costs are reduced substantially to the costs of the chip and the costs of an additional connecting step, in which the chip is adhesively bonded to the laminate and connected to the antenna structure;

c) the antenna can be formed at any desired point on the package; it is possible for a plurality of antennas to be provided on one package, only one antenna being necessary for the electrical function of the transponder; the antenna density merely has to be adapted to the size of the package;

d) the antenna can be configured to be very large, since the entire surface of the object to be identified is available;

e) the layer thickness of the metalization of the film is generally low, the higher resistances of the antenna which are produced as a result can be balanced out by broader conductor tracks;

f) in the laminate according to the invention, immediately behind the antenna there is no metalization which impairs the RF properties of the RF-ID-label, since the antenna is an integral constituent part of the laminate and is not adhesively bonded to the laminate;

g) the number of turns can be increased as desired within the available area, which increases the efficiency of the coupling of energy and therefore the reading distance or the reading integrity;

h) by means of additional capacitors, the resonant behavior can be improved, it being possible for one electrode to be formed by the laminate.

Other features which are considered as characteristic for the invention are set forth in the appended claims.

Although the invention is illustrated and described herein as embodied in a method for manufacturing a packaging material in the form of a laminate with an electrically conductive layer formed as an antenna structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
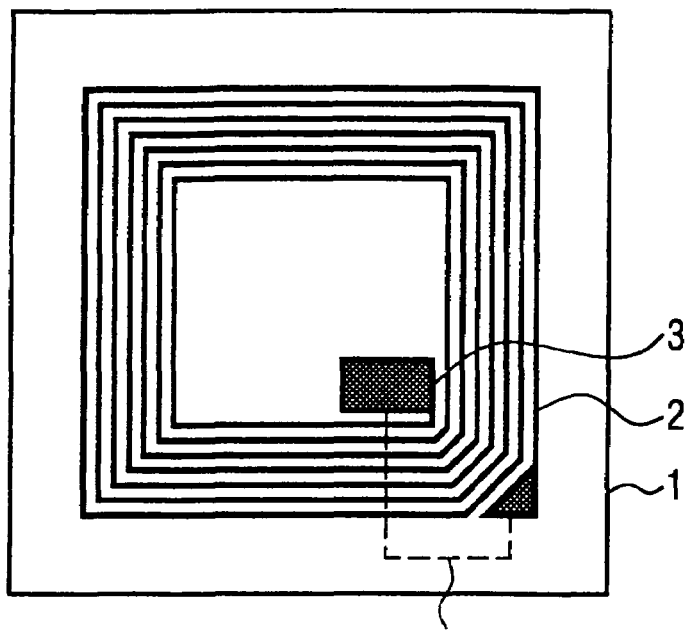
FIG. 1 is a plan view onto a radiofrequency identification label according to the prior art.

Referring now to the figures of the drawing in detail and first, particularly, to FIG. 1 thereof, there is shown a radiofrequency identification label according to the prior art. An antenna structure 2 built up from a plurality of turns is applied to a flexible film 1, which serves as a carrier layer or substrate. The ends of the antenna structure 2 are conductively connected to a silicon microchip 3. The two ends of the antenna structure are connected to each other via a bridge structure 2a. The carrier layer 1 can be provided with adhesive layer on its rear side, in order to be able to fix the label to an object to be identified, for example a file. The antenna structure 2 is first produced separately and then affixed to the film 1. The production of such a label is therefore complicated.

Figure 2:
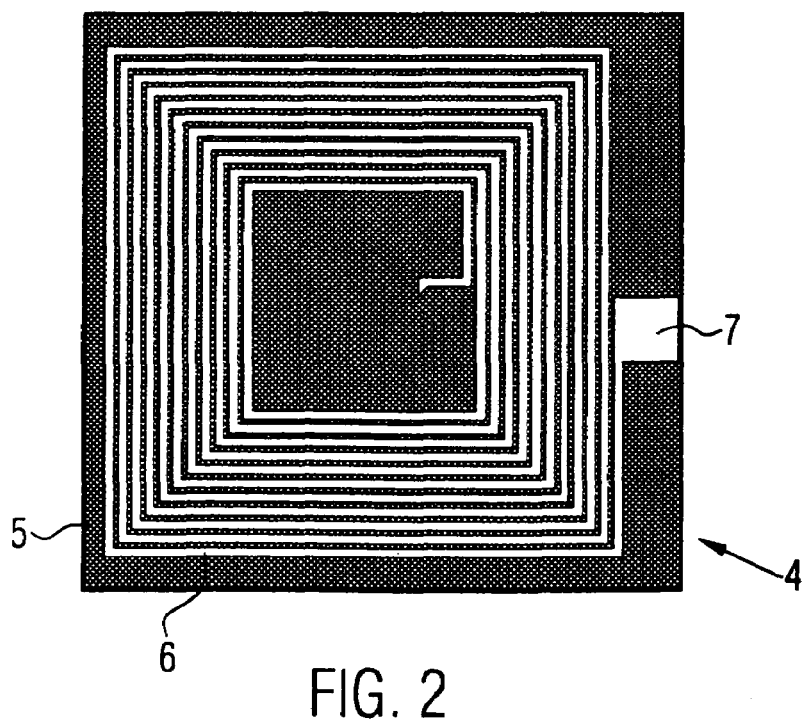
FIG. 2 is an enlarged view of a shadow mask for the production of an antenna structure.

Referring now to FIG. 2, there is illustrated a shadow mask 4 which can be used for the production of the antenna structure in the laminate according to the invention. The shadow mask 4 comprises shadow regions 5, which are illustrated with dark shading in the figure. Also introduced into the shadow mask is a spiral opening 6 that is illustrated in a white spiral. The opening 6 corresponds to the turns of the antenna to be represented. The shadow mask therefore constitutes a negative structure of the antenna to be produced. Packaging films are, for example, vapor-deposited with aluminum from the gas phase in the roll-to-roll process. In this case, the shadow mask 4 is placed on the substrate at a previously defined location. If the shadow mask consists of a magnetizable material, the shadow mask can, for example, be held firmly on the film magnetically. The aluminum is then vapor-deposited onto the film over its entire surface, the regions shadowed by the dark sections 5 of the shadow mask 4 remaining free of aluminum. Following the vapor-deposition of aluminum, the shadow mask 4 is removed from the surface of the film. A microchip can then be adhesively bonded onto the square electrode surface 7 with the aid of a conductive adhesive.

Figure 3:
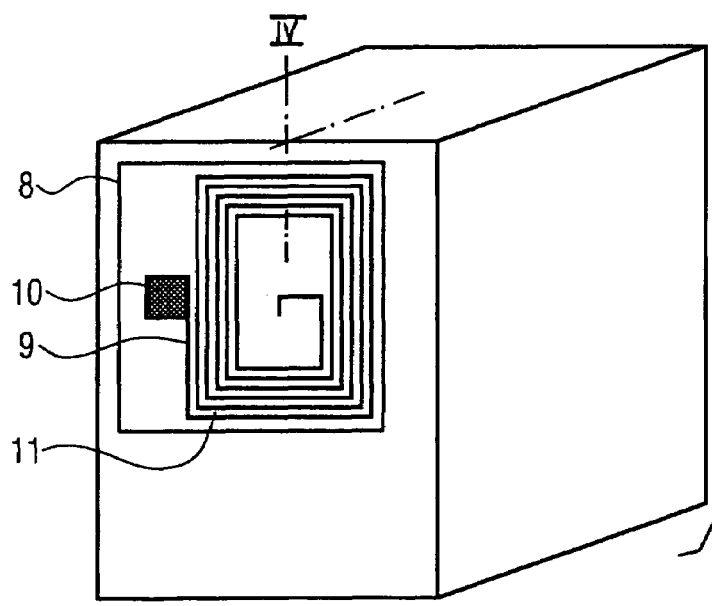
FIG. 3 is an assembly showing a package that has been produced from the laminate according to the invention, and a transmitting and receiving device arranged at a specific distance.

FIG. 3 shows an application of the laminate according to the invention as a package. The laminate comprises a continuous layer of aluminum, which is covered on one side by a board layer and on the other side by a plastic. Provided in the aluminum layer is an area 8 in which an antenna structure 9 is formed from the aluminum layer. The antenna structure 9 is connected to a microchip 10 in which pertinent information such as, for example, date of manufacture, keeping date and price of the consumable article contained in the package are stored. The interspace 11 between turns of the antenna structure 9 and between the antenna structure 9 and the aluminum layer surrounding the latter is filled with an oxygen-impermeable layer. For this purpose, a non-illustrated film of an oxygen-impermeable material can be adhesively bonded to the antenna structure. Via a transmitting and receiving installation 12, by means of electromagnetic radiation 13, data can be read out from the microchip 10 without contact via the antenna structure 9 conductively connected to the microchip 10, or can be read into said microchip. The transmitting and receiving installation 12 can, for example, be connected to the cash register of a supermarket, in order to read the data out from the microchip. However, it can also be fitted to a production line and there, for example, read data about the date of manufacture, the type of product or the price into the microchip 10.

Figure 4:
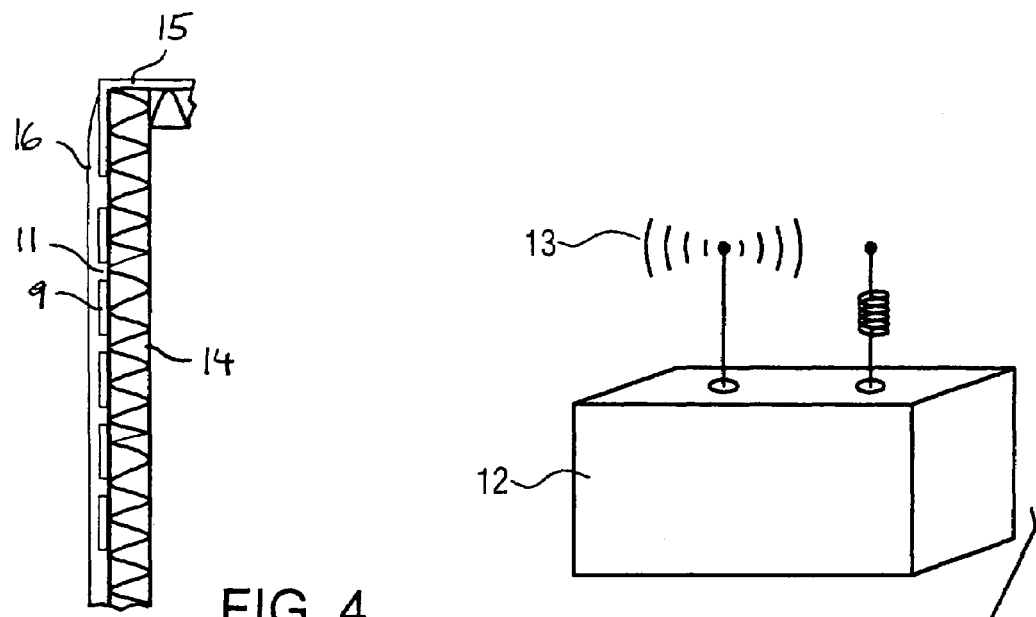
FIG. 4 is a partial section taken in the plane IV in FIG. 3 and viewed from the right-hand side in FIG. 3.

Referring now to FIG. 4, which illustrates a partial section along the plane IV in FIG. 3, the laminate of the package box is formed of a cardboard substrate 14, the electrically conductive layer 15, and a covering layer 16. The conductive layer 15, in a preferred embodiment, is a vapor-deposited aluminum layer. The covering layer 15 is illustrated only on the side of the box that carries the antenna according to the invention. It is understood that the covering layer 15 may completely encase the entire box. The covering layer may be a varnish layer or a further layer of a board. A layer of a plastic is likewise possible. The additional layer leads not only to protection against external influences, but also provides for a higher mechanical stability of the laminate. Preferably, the covering layer consists of a water-repellent material. This prevents possible corrosion of the electrically conductive layer and also prevents the penetration of water-soluble contaminants into the laminate and the interior of the package. A particularly preferable material for the covering layer 15 is a layering plastic, such as is usual, for example, in beverage packages.

We claim:

1. A method for manufacturing a packaging material in the form of a laminate, the method comprising:

placing a mask onto a packaging film;

depositing aluminum onto the packaging film by vapor deposition;

removing the mask with excess aluminum, causing only a desired antenna structure to remain on a section of the packaging film;

bonding a microchip adhesively to the packaging film; and conductively connecting the microchip to an end of the antenna structure.

2. The method according to claim 1, wherein the aluminum has a thickness of up to 400 nm.

3. The method according to claim 1, wherein the packaging film is made of a paper-type material.

4. The method according to claim 1, wherein the packaging film is made of a polymeric material.

5. The method according to claim 4, which further comprises building-up the polymeric material from non-polar hydrocarbon monomers.

6. The method according to claim 1, which further comprises placing the mask onto the packaging film by printing.

7. The method according to claim 1, which further comprises carrying out the step of bonding the microchip with a conductive adhesive.

8. The method according to claim 1, which further comprises covering the packaging material, at least in some sections, with a layer of an oxygen-impermeable material.

9. The method according to claim 1, which further comprises forming the packaging material into a package enclosing a hollow space for containing at least one foodstuff.

10. The method according to claim 1, which further comprises conductively connecting an electronic capacitor to the antenna structure.

* * * * *